Oct. 11, 1966 G. F. BREMER 3,277,992
EMBOSSING TOOL WITH CUTTING MEANS BETWEEN
EMBOSSING STATION AND TAPE SUPPLY
Filed Sept. 20, 1965 3 Sheets-Sheet 3

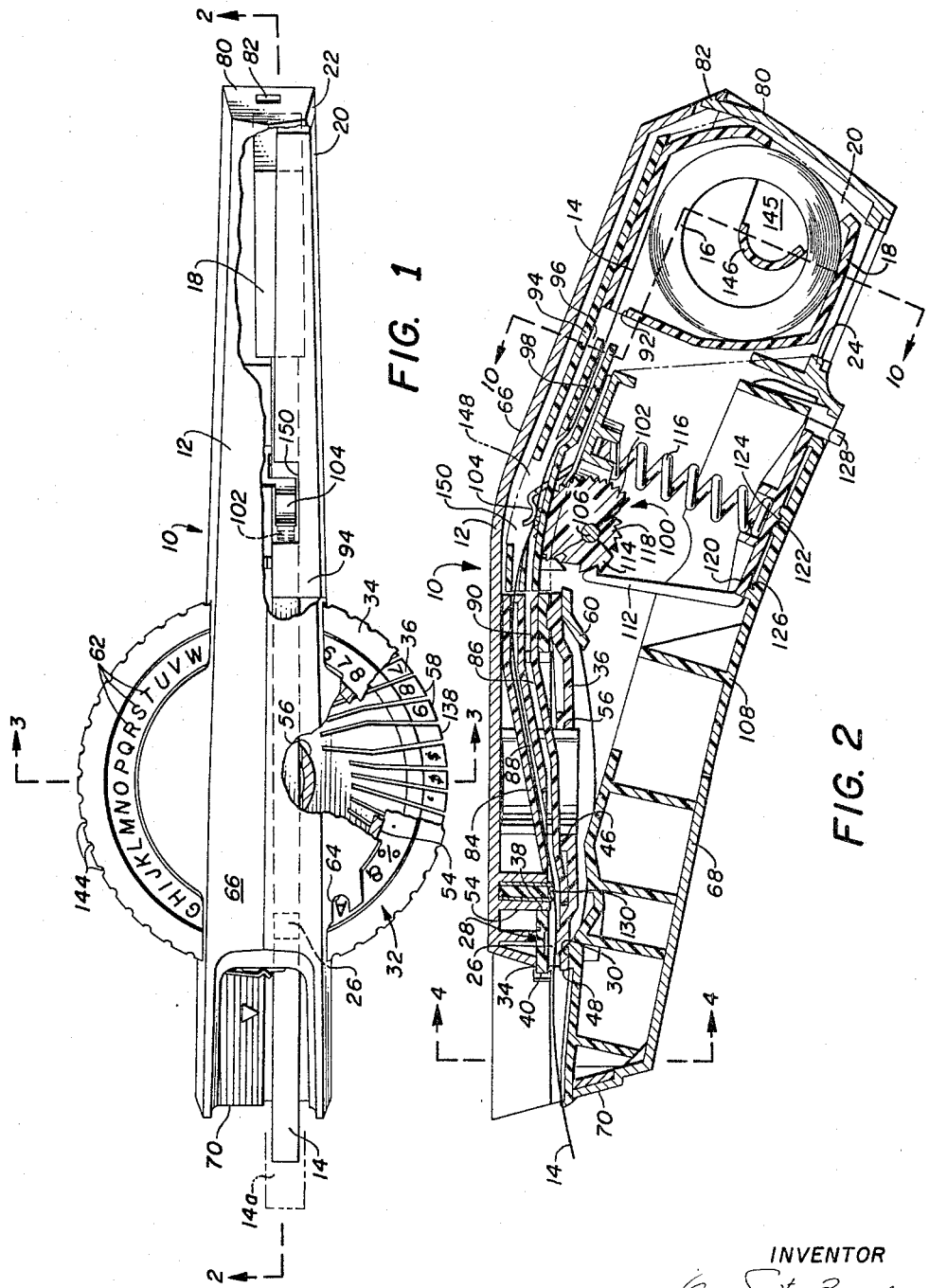

INVENTOR
Georg Fritz Bremer
BY
Samuelson & Jacob

United States Patent Office 3,277,992
Patented Oct. 11, 1966

3,277,992
EMBOSSING TOOL WITH CUTTING MEANS BETWEEN EMBOSSING STATION AND TAPE SUPPLY
Georg Fritz Bremer, Albany, Calif., assignor to Dymo Industries, Inc., Emeryville, Calif., a corporation of California
Filed Sept. 20, 1965, Ser. No. 488,359
11 Claims. (Cl. 197—6.7)

The present invention relates generally to embossing tools for embossing indicia upon strip material and pertains more specifically to such tools wherein a strip of embossable material is advanced through the body of the tool from a strip supply toward an embossing station in the body and which includes a simplified structural arrangement that lends itself to improved registration of the strip material with the various means which operate upon the strip material.

A variety of embossing tools is presently available for establishing embossments in strips of embossable material in the fabrication of labels, signs, plates, tags, and like embossed articles. More recently, such tools have been developed for embossing various indicia on thin plastic strips formed of sheeted thermoplastic synthetic resins which are capable of being cold-formed to establish a contrast color relief enfigurement therein.

Usually the tools employ embossing means for establishing the desired embossments, a supply of strip material and means for feeding the strip material from the supply to the embossing means. The strip material is usually in the form of an elongated flexible tape supplied in a coil which is generally placed in a magazine, the magazine being received within the body of the tool. Often the tape is supplied in different widths so that embossed articles with different widths may be fabricated.

In embossing indicia on the tape, it is desirable to register the tape accurately with respect to the embossing means, especially in a lateral direction, so that the indicia will be embossed along a uniform, well spaced line on the tape. Such a result may be achieved by the employment of a tape guide or track which positively locates the longitudinal edges of the tape to align the tape with the embossing means and maintain the tape in such alignment during embossing operations.

It is an object of the invention to provide an embossing tool having an improved structural arrangement for accomplishing better registration of the strip of embossable material with embossing means in the tool.

Another object of the invention is to provide an embossing tool which will accommodate embossable strip material of different widths without requiring adjustment of the components of the tool for such an accommodation.

Still another object of the invention is to provide improved means for severing the strip material to complete the embossed articles such that the number of manipulations is reduced in comparison to earlier embossing tools.

A further object of the invention is to provide for simplified insertion and threading of the strip material within the tool.

A still further object of the invention is to provide an embossing tool having a reduced number of component parts and having a simplified construction which is readily manufactured and easily assembled.

The invention will be more fully understood and further objects and advantages thereof will become apparent in the following detailed description of an embodiment of the invention illustrated in the accompanying drawing, in which:

FIGURE 1 is a top plan view of an embossing tool constructed in accordance with the invention with portions cut away to illustrate internal details;

FIGURE 2 is a longitudinal cross-sectional view taken along line 2—2 of FIGURE 1;

Figure 3:
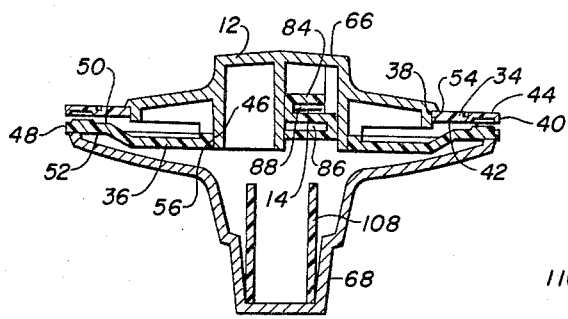
FIGURE 3 is a transverse cross-section taken along line 3—3 of FIGURE 1.

Referring now to the drawing, a hand operated embossing tool is indicated generally at 10 in FIGURES 1 and 2. Tool 10 has a body or housing 12 which has a general configuration adapted to make the tool easily operated while being held in one hand. The tool is designed to emboss selected indicia on an elongated strip of embossable material such as the variety of thermoplastic synthetic resins currently available in the form of plastic tapes of various widths. As seen in FIGURE 2, an embossable tape 14 is supplied in the form of a coil or roll 16 lying in a magazine 18 which is received within the housing 12 through a door 20 in side 22 of the housing (see FIGURE 1), the door 20 being hinged to the housing at 24 in a manner which will be more fully explained hereinafter.

Embossing of the tape 14 is accomplished at an embossing station 26 wherein there is located embossing means shown in the form of an embossing die set 28 actuated by a reciprocating actuating member 30. Die set 28 is one of a series of die sets located in annular means shown in the form of an annular selector wheel 32 which is rotatably mounted in housing 12 in a manner which will be explained below so that any one of the series of die sets can be located at the embossing station 26 to emboss selected indicia in the tape 14. Selector wheel 32 is made up of upper and lower annular members 34 and 36, respectively, one of which carries the die and the other of which carries the punch of each die set. As best seen in FIGURE 3, upper annular member 34 has inner and outer boundaries 38 and 40 and inner and outer faces 42 and 44, respectively. Similarly, lower annular member 36 has inner and outer boundaries 46 and 48, respectively, and inner and outer faces 50 and 52, respectively. The upper annular member is journaled for rotation in the housing by means of the engagement of the inner boundary 38 with a first depending cylindrical surface 54 in the housing. The lower annular member is journaled for rotation coaxially with the upper member by virtue of inner boundary 46 engaging a second depending cylindrical surface 56 in the housing which is coaxial with first cylindrical surface 54. The punch and die of each die set is carried between the inner and outer boundaries of each respective annular member and the annular members are spaced apart axially such that each die set is normally open around the major portion of the selector wheel. The lower annular member 36 is divided into a plurality of radially extending fingers 58, each of which carries one of the portions of a die set, any of the fingers 58 being resiliently deflectable upwardly to engage the punch and die portions of a particular die set. As seen in FIGURE 2, housing 12 is provided with a ledge 60 which is located adjacent the lower annular member at a position remote from the embossing station and positioned with respect to the upper and lower annular members so as to urge one of the fingers 58 and hence the punch and die portions of the particular die set which is engaged by the ledge into engagement with one another. In this manner, the upper and lower annular members are interlocked with one another so that both will rotate together without relative rotation upon rotation of selector wheel 32. As best seen in FIGURE 1, the upper annular member 34 is provided with visible characters 62 on the outer face thereof corresponding to the indicia which can be embossed by the selectable die sets. The visible characters are also located between the inner and outer boundaries of the upper annular member, but are circumferentially displaced from the corresponding die sets so that when a particular die set is located at the embossing station 26, the corresponding visible character is located at a selector slot 64 provided in the housing 12.

Figure 4:
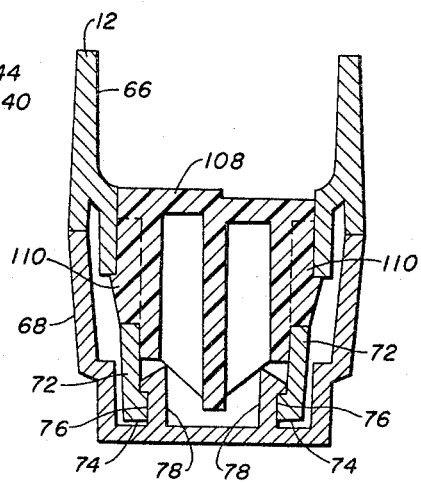
FIGURE 4 is an enlarged cross-sectional view taken along line 4—4 of FIGURE 2.

Housing 12 is actually a two-piece construction made up of a top component part 66 and a bottom component part 68. Top part 66 is pivotally interconnected with bottom part 68 adjacent the forward end 70 of the housing, as best seen in FIGURE 4 wherein top part 66 is shown provided with depending legs 72 having stub shafts 74 projecting inwardly therefrom and journaled within sockets 76 provided therefor in upstanding legs 78 of bottom part 68. In assembling the top and bottom component parts, the stub shafts 74 are merely snapped into place within the sockets 76 by virtue of outward deflection of legs 72 and inward deflection of legs 78 during assembly to permit the stub shafts to be lodged within the sockets. Top and bottom component parts 66 and 68 are normally latched together at the rearward end 80 of the housing by means of latch 82 (see FIGURE 2) which may be released to allow upward pivotal movement of top part 66 with respect to bottom part 68 whereby access is gained to the selector wheel 32 for permitting removal of the selector wheel and replacement thereof with any of a number of selector wheels provided with a variety of embossable indicia of different styles and sizes. By opening the housing 12, the upper and lower annular members 34 and 36 of the selector wheel 32 need merely be drawn from their engagement with cylindrical surfaces 54 and 56 which depend from the top part 66.

As best seen in FIGURES 2 and 3 a guide 84 is fitted within top component 66 and provides two tracks or channels 86 and 88 of different widths, both channels defining a path extending over the annular members at 90 and thence into the area within the inner boundary of the annular selector wheel 32. Since the selector wheel is generally circular, it is seen that the guide 84 lies in a vertical plane which passes through and contains a chord of the circle defined by the outer boundary of the selector wheel 32. Channel 86 has a relatively greater width for accommodating and laterally aligning a wider tape (shown in phantom at 14a in FIGURE 1) along the path, while channel 88 is narrower for aligning a narrower tape along the path.

Tape 14 is fed from supply roll 16 through an aperture 92 in magazine 18 and into a further guide 94 which is also provided with two tracks or channels 96 and 98, channel 96 being wider than channel 98, for accommodating tapes of two different widths. The further guide 94 is intercepted by feed means 100 which advances tape 14 in prescribed increments by means of a feed roll 102 which frictionally grips the tape where a leaf spring 104 presses the tape against the serrated surface of the roll and which may be rotated in a counterclockwise direction (as seen in FIGURE 2) along with shaft 106 upon which roll 102 is mounted, shaft 106 being journaled in the housing, all as will be explained hereinafter.

Figure 7:
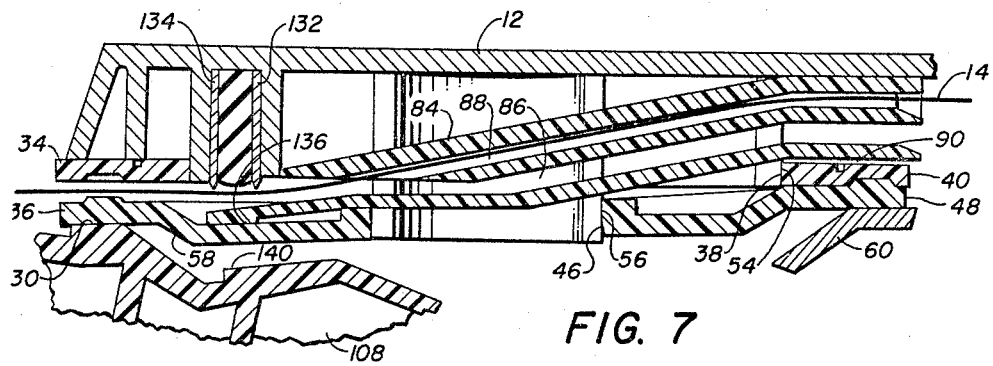
FIGURE 7 is an enlarged portion of FIGURE 2 illustrating details of construction.

Embossing of tape 14 is accomplished by displacing actuating means illustrated in the form of lever 108, which is pivotally mounted to top part 66 of housing 12 at 110 (see FIGURE 4), in a counterclockwise direction to depress the lever and bring actuating member 30, which is a part of the lever 108, vertically upwardly into contact with one finger 58 of lower annular member 36, as seen in FIGURE 7, and continuing such displacement until member 30 actuates the die set 28 positioned at the embossing station 26 and an embossment is established in the tape. At the same time, pawl 112 is moved vertically upwardly to engage the next successive tooth of a ratchet wheel 114 which is operatively interengaged with feed roll 102 such that rotation of the ratchet wheel will rotate the feed roll. During the depression of actuating lever 108, helical spring 116 is compressed so that upon completion of the embossing operation and release of actuating lever 108 the leved is urged back to its starting or rest position by spring 116 with a force sufficient to assure that pawl 112 will rotate ratchet wheel 114 in a counterclockwise direction to rotate feed roll 102 and advance tape 14 through the increment necessary to index the tape for a subsequent embossment.

Figure 5:
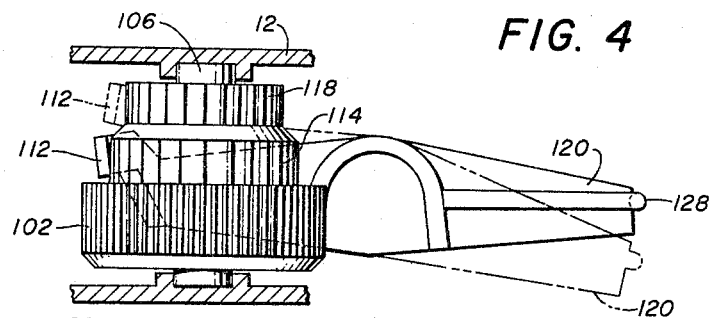
FIGURES 5 and 6 are enlarged fragmentary views illustrating details of construction.
Figure 6:
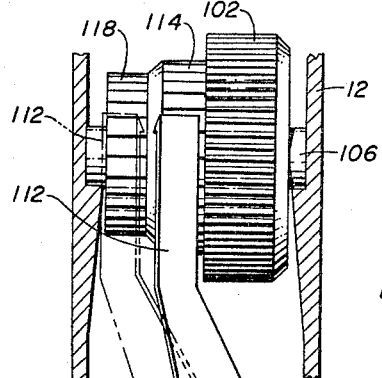

Since tool 10 is capable of accommodating tapes of different widths and selector wheels having a variety of embossable indicia, it has also been found advantageous to provide means for varying the length of the increment through which the tape is indexed by the feed means. Referring now to FIGURES 2, 5 and 6, feed means 100 is provided with a second ratchet wheel 118 which has a smaller diameter than the first ratchet wheel 114 and which has teeth spaced at smaller intervals than the teeth of first ratchet wheel 114. The pawl 112 is shown to be integral with a bar 120 which is pivotally mounted at its center by means of a projection 122 engaging a socket 124 in lever 108. Bar 120 is maintained in either one of two positions by detent means 126, the first position being shown in full lines while the second position is shown in phantom in FIGURES 5 and 6, and is movable between the two positions by the displacement of button 128 which passes through lever 108 so as to be accessible to an operator who may select either of the two positions. In the first position of bar 120, pawl 112 is aligned for engagement with ratchet wheel 114 and the feed means will feed tape 14 in relatively large increments. In the second selectable position of bar 120, pawl 112 is aligned with ratchet wheel 118 and feed means 100 will index tape 14 in relatively small increments.

Figure 8:
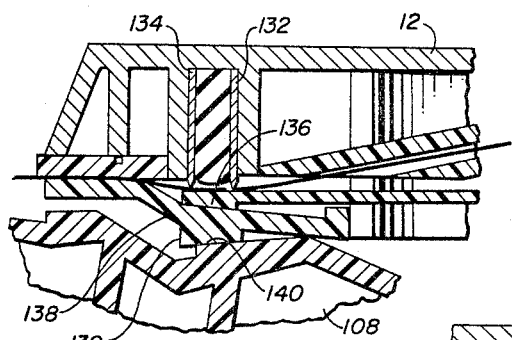
FIGURE 8 is an enlarged portion of FIGURE 7 with certain component parts shown in a different operating position.
Figure 9:
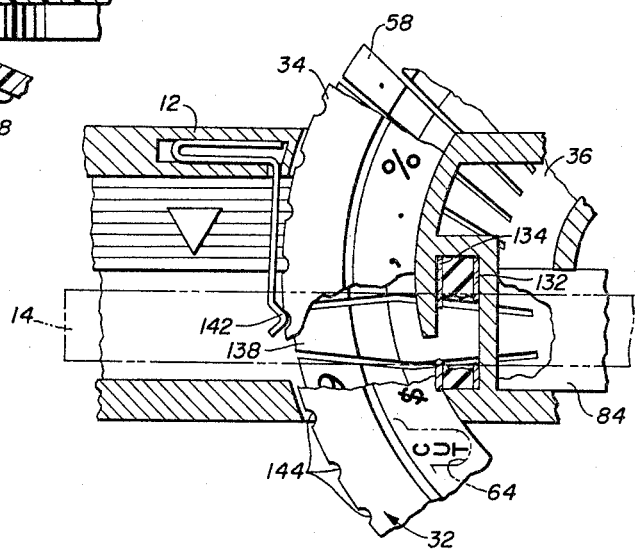
FIGURE 9 is an enlarged fragmentary plan view of a portion of the tool.

Upon completion of the particular embossed article, the article may be severed from the tape by cut-off means illustrated at 130 in the form of blades 132 and 134 located vertically above the path of tape 14 and an anvil 136 located below the path of tape 14, the cut-off means being located in the housing adjacent the inside boundary of the selector wheel 26 between the embossing station 26 and the coiled supply 16. As best seen in FIGURES 7, 8 and 9, anvil 136 is part of a cantilever portion extending from guide 84, and is resiliently movable in a vertical direction, but is normally displaced away from blades 132 and 134 so as to allow free passage of tape 14 from guide 84 to the embossing station 26. When the last embossment of a particular embossed article is completed and the tape has been automatically indexed by the feed means 100, the selector wheel 32 is rotated until finger 138 of the lower annular member 36 is positioned below the path of the tape (see FIGURE 9). This position may be determined by the operator by observing the word "cut" in selector slot 64. Finger 138 does not carry a die set portion but is provided with a downwardly depending projection 139 which is positioned above a second reciprocating means 140 on lever 108. Upon depression of lever 108 second reciprocating means 140 will engage projection 139 and deflect finger 138 upwardly along with anvil 136. Such upward movement of the anvil will bring tape 14 against cutting blades 132 and 134. Blade 132 will then sever the tape while blade 134 will establish a tab at the severed end of the completed embossed article for facilitating the subsequent removal of a backing strip which is generally present as a part of the embossable strip material. Upon return of lever 108 to its starting or rest position the resiliency of finger 138 and the cantilever portion of which anvil 136 is a part will return these members back to their normal starting positions as shown in FIGURE 7 and feed means 100 will advance the tape 14 through a prescribed increment as before. It is noted that selector wheel 32 is maintained in any selected position by virtue of detent spring 142 engaging any one of a plurality of notches 144 in the outer perimeter of upper annular member 34.

It will be apparent that the location of the cut-off means 130 rearwardly of the embossing station permits the severance of a completed embossed article and the start of a new embossed article without requiring any manual advancement of tape 14 beyond the automatic advancement provided by feed means 100 subsequent to the embossment of the last indicia on a completed article and subsequent to the severance of a completed article from the tape by the cut-off means. The provision of generally continuous guide channels 86 and 88 for each width of tape right up to the cut-off means and very close to the embossing station assures that tapes of different widths will be accurately aligned with the embossing means and the cut-off means of the tool without requiring adjustments to compensate for each tape width to be accommodated. Likewise, the provision of channels 96 and 98 assure that tapes of different widths are adequately aligned with the feed means to assure accurate and fool-proof advancement of tape 14 by the feed means.

Figure 10:
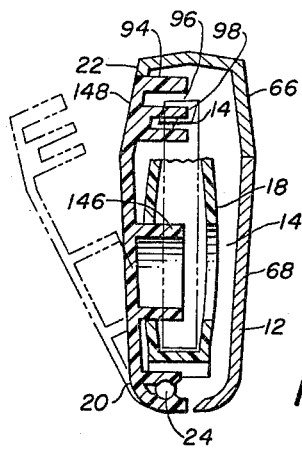
FIGURE 10 is a transverse cross-sectional view taken along line 10—10 of FIGURE 2.

Turning now to FIGURE 10 the provision of door 20 is seen to facilitate the insertion of a supply of tape into a tape supply compartment 145 adjacent the rear of housing 12. Door 20 is hinged at 24 for movement in a direction transverse to the direction of the path of travel of the tape. When the door is open, as illustrated in phantom in FIGURE 10, a magazine 18 may be placed in the door and properly located and retained by arbor 146. The tape may then be drawn from the cartridge and threaded through the appropriate channel 96 or 98, both of which channels are integral with door 20 and extend along portion 148 of the door. Portion 148 of door 20 extends forward alongside the path of the tape all the way to the perimeter of selector wheel 32 so that guide 94, which provides channels 96 and 98, will meet with guide 84 and its respective channels 86 and 88 thereby providing relatively continuous guide channels from adjacent aperture 92 in magazine 18 to closely adjacent the embossing means and the cut-off means. Since the feed means 100 intercepts the channels 96 and 98 provided by guide 94 through a notch 150 in guide 94, threading of the tape through either channel while the door is open will automatically place the tape between feed roll 102 and leaf spring 104 upon closing of the door. Thus, threading of the tape is facilitated and accurate alignment of the tape with the various operating component parts of the tool is attained with ease.

It is to be understood that the above detailed description of an embodiment of the invention is provided by way of example only. Various details of design and construction may be modified without departing from the true spirit and scope of the invention as set forth in the appended claims.

What is claimed is:

1. A tool for embossing a strip of embossable material wherein the strip is advanced in predetermined increments along a path through the body of the tool from a strip supply to an embossing station, said tool comprising:
    a housing;
    embossing means including a plurality of die sets located between the radially inner and outer boundaries of annular means rotatably mounted in said housing for selective positioning of any one of the die sets at the embossing station, said annular means including first and second radially extending, axially spaced annular members, one of said members carrying the punch portions of said die sets and the other of said members carrying the die portions of said die sets;
    means in said housing for guiding said strip along said path, the path extending over the annular members into the area within the inner boundary of said annular means and thence between the spaced annular members at the embossing station; and
    fixed means in said housing adjacent at least one location along the annular means remote from the embossing station for urging the punch and die portions of at least the die set at the remote location into engagement with one another to interlock said first and second annular members together in fixed relative relationship for concurrent rotation during rotation of the annular means.

2. The tool of claim 1 wherein said annular members each have an inside face and an opposite outside face, the inside faces being spaced apart and facing one another, and said path lies in an axially extending plane containing a chord of the outside boundary of said annular means, said guide means including at least one generally continuous channel in said housing running in said plane from adjacent the outside face of one annular member at one end of said chord to adjacent the spaced inside faces at the other end of said chord.

3. The tool of claim 2 wherein said guide means includes at least two continuous channels, each channel having a different predetermined width, for accommodating strip material of at least two different widths.

4. A tool for embossing a strip of embossable material as defined in claim 1 and for severing an embossed article from the strip, said tool including
    means in the housing for actuating the die set located at the embossing station;
    means in the housing for advancing said strip through one said predetermined increment subsequent to actuation of the die set in response to the actuation of the die set actuating means; and
    cut-off means in the housing located in said path between the embossing station and the supply adjacent the inside boundary of the annular means and adjacent the embossing station for selectively severing the strip upon completion of the final embossment in the embossed article and advancement of the strip through said one predetermined increment.

5. The tool of claim 4 wherein the cut-off means includes blade means fixed relative to the path of the strip in the housing and anvil means in said housing normally positioned such that the strip passes between the blade means and the anvil means, said anvil means being movable from the normal position toward the blade means to press the strip against the blade means and sever the strip; and
    means located at one position along said annular means for selectively engaging the die set actuating means with the anvil means to move the anvil means in response to actuation of said actuating means and sever the embossed article from the strip.

6. The tool of claim 5 wherein said annular members are upper and lower coaxial annular members;
    said die set actuating means includes a lever mounted for pivotal movement in the housing below the lower annular member and includes a first portion for contacting the lower annular member adjacent the die set positioned in the embossing station for actuating that die set and a second portion for reciprocating below the anvil means in response to pivotal movement of the lever; and
    said means located along the annular means includes a projection on the lower annular member selectively positionable between the anvil means and the second portion of the lever by rotation of the annular means.

7. A tool for embossing a strip of embossable material as defined in claim 1, wherein the tool includes feed means for advancing the strip along said path and the housing extends from front to rear of the tool and includes side walls, said tool further comprising:
  a compartment adjacent the rear of said housing for containing the supply of embossable material;
  a door in one side wall of said housing adjacent the rear of the housing for providing access to the supply compartment, said door including a portion extending alongside said path from the supply compartment toward the embossing station;
  means in said door for locating and retaining a supply of strip material; and
  further guide means in the door extending along said portion of the door for facilitating insertion of the supply of strip material and threading of the strip material through the feed means, said further guide means extending forward to the guide means in said housing which guides said strip over the annular members and toward the embossing station;
  said door being hinged to said housing for movement in a direction transverse to the direction of said path.

8. The tool of claim 7 wherein said further guide means includes at least one channel leading from the supply along said portion of the door.

9. The tool of claim 7 wherein said further guide means includes at least two channels leading from the supply along said portion of the door, each channel having a different width for accommodating strip material of two different widths.

10. A tool for embossing a strip of embossable material, the tool including feed means for advancing the strip along a path through the body of the tool from a strip supply to an embossing station, said tool comprising:
  a housing extending from front to rear of the tool and including side walls;
  a compartment adjacent the rear of said housing for containing the supply of embossable material;
  a door in one side of said housing adjacent the rear of the housing for providing access to the supply compartment, said door being displaceable to open said compartment and including a portion extending along said path from the supply compartment to the feed means;
  means integral with said door for retaining a supply of strip material; and
  guide means integral with the door and extending along said portion of the door for facilitating insertion of the supply of strip material and threading of the strip to the feed means, said guide means including at least one channel capable of carrying and guiding said strip material during displacement of the door.

11. A tool for embossing a strip of embossable material wherein the strip is advanced along a path through the body of the tool from a strip supply to an embossing station, said tool comprising:
  a housing;
  embossing means rotatably mounted in said housing including a plurality of die sets radially mouned on the periphery of said embossing means and selectively locatable at said embossing station for embossment of said strip;
  cut-off means located in said path at a given position displaced from said embossing station towards said strip supply a distance sufficient to allow the strip material to be severed by actuation of said cut-off means upon completion of the final embossment, said cut-off means including cutting means, anvil means and actuating means each located at said given position, said actuating means being selectively engaged to accomplish said actuation at said given position so that the severing may be accomplished without requiring a repositioning of said strip along said path thereby producing a label with a predetermined space between the last embossed indicia and the severed end.

References Cited by the Examiner

UNITED STATES PATENTS

| | | | |
|---|---|---|---|
| 2,275,670 | 3/1942 | Zipf | 197—5.7 |
| 3,127,989 | 4/1964 | Travaglio | 197—6.7 X |
| 3,155,215 | 11/1964 | Avery | 197—6.7 |

ROBERT E. PULFREY, *Primary Examiner.*

E. S. BURR, *Assistant Examiner.*